(12) United States Patent
Huang

(10) Patent No.: US 7,625,002 B2
(45) Date of Patent: Dec. 1, 2009

(54) VEHICLE FRAME WITH A ROTATION LIMITING MECHANISM FOR LIMITING ROTATION OF A STEERER RELATIVE TO A HEAD TUBE

(75) Inventor: Toshi Huang, Taichung Hsien (TW)

(73) Assignee: Gomier Manufacturing Co., Ltd., Taichung Hsien (TW)

( * ) Notice: Subject to any disclaimer, the term of this patent is extended or adjusted under 35 U.S.C. 154(b) by 342 days.

(21) Appl. No.: 11/635,131

(22) Filed: Dec. 6, 2006

(65) Prior Publication Data

US 2008/0136137 A1 Jun. 12, 2008

(51) Int. Cl.
*B62K 21/00* (2006.01)

(52) U.S. Cl. .................. 280/272; 280/279; 74/493; 74/495

(58) Field of Classification Search .......... 280/272, 280/279; 74/495, 493
See application file for complete search history.

(56) References Cited

U.S. PATENT DOCUMENTS

| | | | | |
|---|---|---|---|---|
| 5,492,033 A | * | 2/1996 | Hopey | 74/551.1 |
| 5,516,133 A | * | 5/1996 | Motrenec et al. | 280/272 |
| 5,836,213 A | * | 11/1998 | Hopey | 74/551.2 |
| 5,927,740 A | * | 7/1999 | Hopey | 280/272 |
| 6,145,637 A | * | 11/2000 | Hopey | 188/306 |
| 6,802,519 B2 | * | 10/2004 | Morgan et al. | 280/272 |
| 7,011,324 B2 | * | 3/2006 | Salonia et al. | 280/272 |

* cited by examiner

*Primary Examiner*—Lesley D Morris
*Assistant Examiner*—Michael R Stabley
(74) *Attorney, Agent, or Firm*—Christie, Parker & Hale, LLP

(57) ABSTRACT

A vehicle frame includes a head tube, a fork, and a rotation limiting mechanism. The fork includes a steerer that extends rotatably through the head tube. The rotation limiting mechanism is operable so as to limit rotation of the steerer relative to the head tube, and includes first and second positioning units, and an engaging unit. The first positioning unit is coupled to the head tube. The second positioning unit is coupled to the steerer. The engaging unit engages releasably the first and second positioning units to thereby limit rotation of the steerer relative to the head tube.

4 Claims, 8 Drawing Sheets

VEHICLE FRAME WITH A ROTATION LIMITING MECHANISM FOR LIMITING ROTATION OF A STEERER RELATIVE TO A HEAD TUBE

BACKGROUND OF THE INVENTION

1. Field of the Invention

This invention relates to a vehicle frame, more particularly to a vehicle frame that includes a head tube, a fork with a steerer, and a limiting mechanism that is operable so as to limit rotation of the steerer relative to the head tube.

2. Description of the Related Art

A conventional vehicle frame, which is applied to a bicycle or a tricycle, includes a head tube and a fork. The fork includes a steerer that extends rotatably through the head tube.

It is desirable to provide a vehicle frame that can limit rotation of the steerer relative to the head tube.

SUMMARY OF THE INVENTION

According to the present invention, a vehicle frame comprises a head tube, a fork, and a rotation limiting mechanism. The fork includes a steerer that extends rotatably through the head tube. The rotation limiting mechanism is operable so as to limit rotation of the steerer relative to the head tube, and includes first and second positioning units, and an engaging unit. The first positioning unit is coupled to one of the head tube and the steerer. The second positioning unit is coupled to the other of the head tube and the steerer. The engaging unit engages releasably the first and second positioning units to thereby limit rotation of the steerer relative to the head tube.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
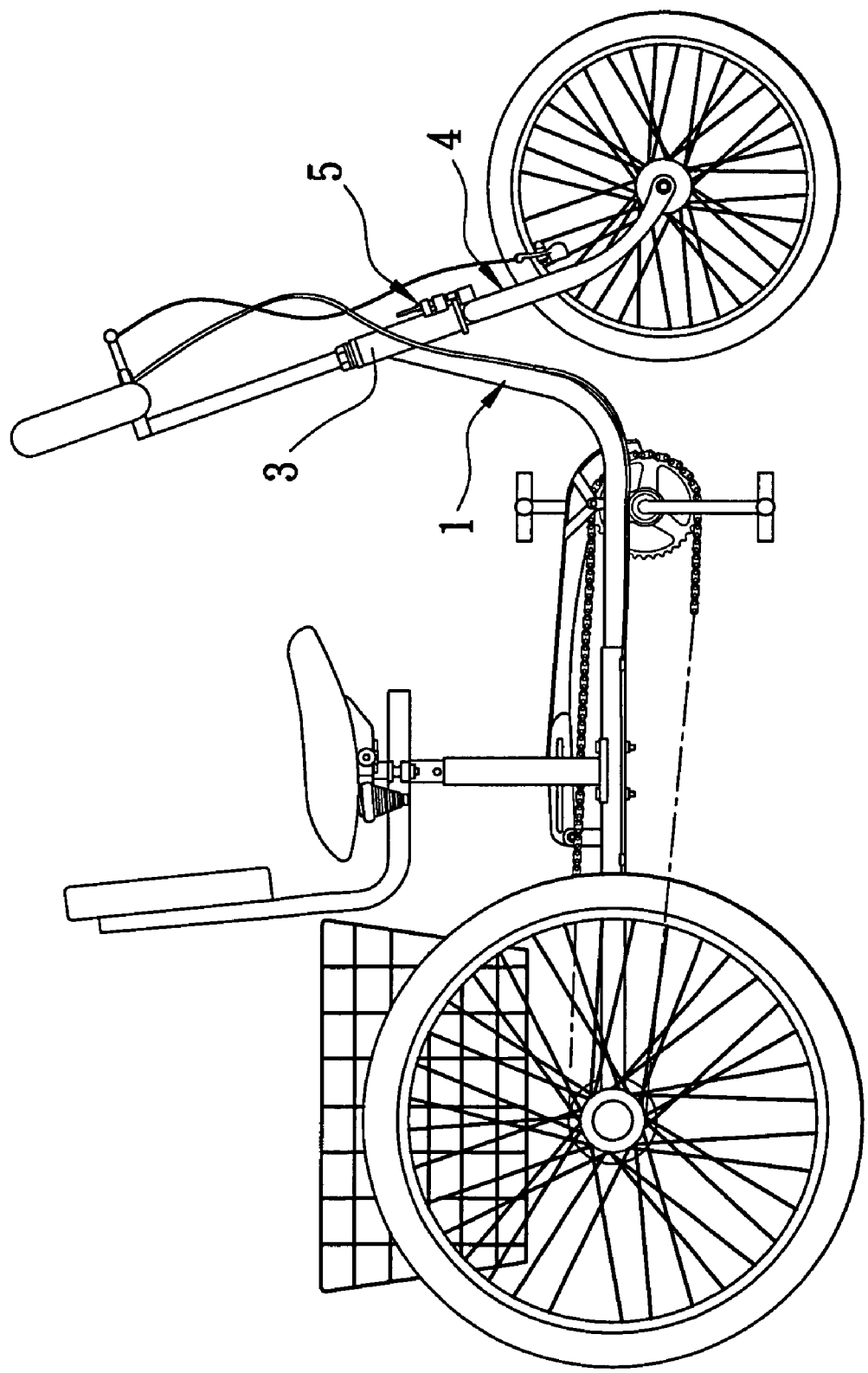
FIG. 1 is a schematic view of the preferred embodiment of a vehicle frame, which is applied to a tricycle, according to the present invention.
Figure 2:
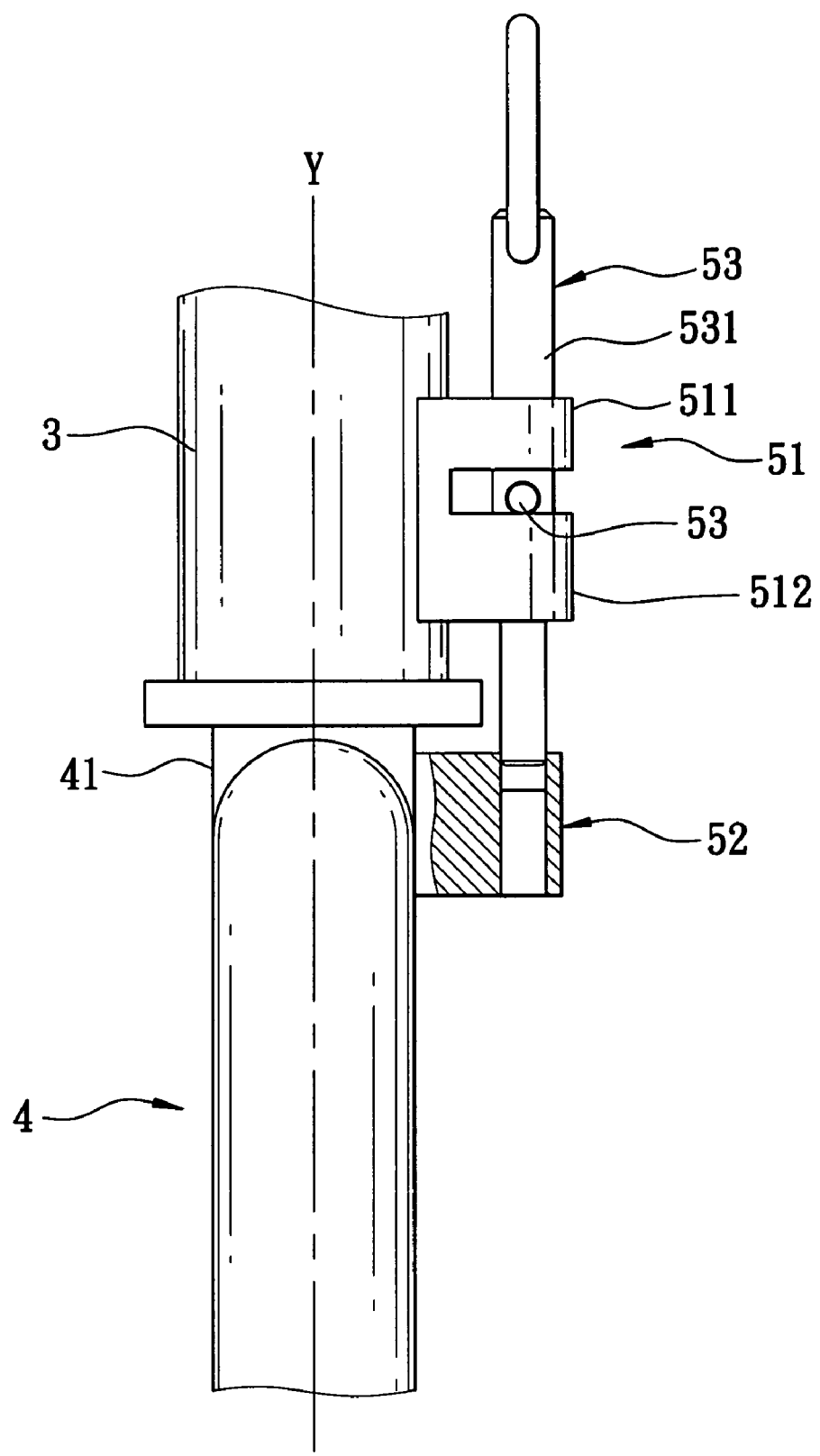
FIG. 2 is a fragmentary, partly sectional view to illustrate a head tube, a fork, and a rotation limiting mechanism of the preferred embodiment.

Referring to FIGS. 1 and 2, the preferred embodiment of a vehicle frame 1 according to this invention is shown to include a head tube 3, a fork 4, and a rotation limiting mechanism 5.

The vehicle frame 1 of this embodiment may be applied to a tricycle. In an alternative embodiment, the vehicle frame 1 may be applied to a bicycle.

The fork 4 includes a steerer 41 that extends rotatably through the head tube 3 and that has an axis of rotation (Y). The steerer 41 is rotatable relative to the head tube 3 within a predetermined first angle.

The rotation limiting mechanism 5 is operable so as to limit rotation of the steerer 41 relative to the head tube 3 within a second angle that is less than the first angle, in a manner that will be described hereinafter.

Figure 3:
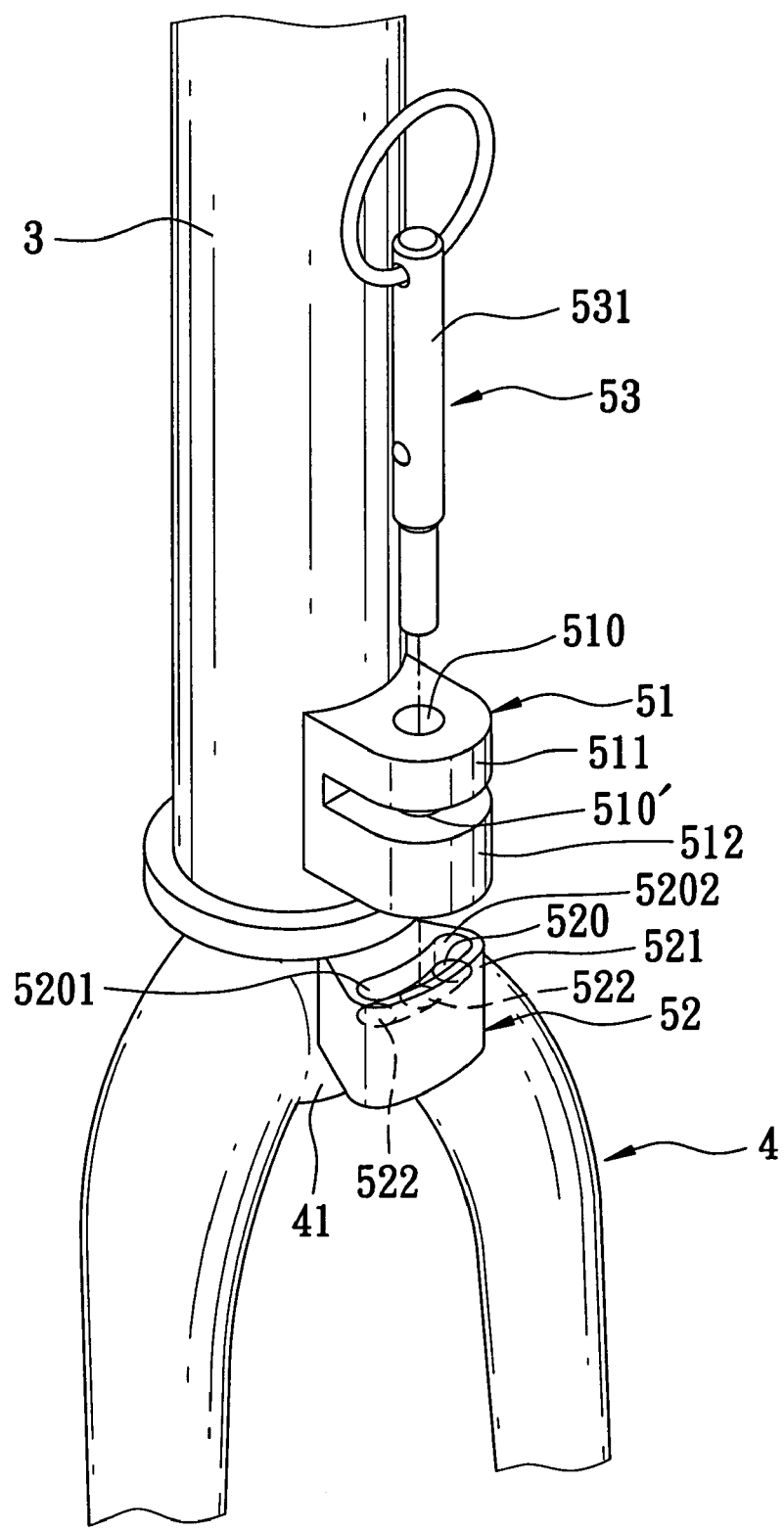
FIG. 3 is a fragmentary perspective view to illustrate first and second positioning units, and an engaging unit of the rotation limiting mechanism of the preferred embodiment.
Figure 4:
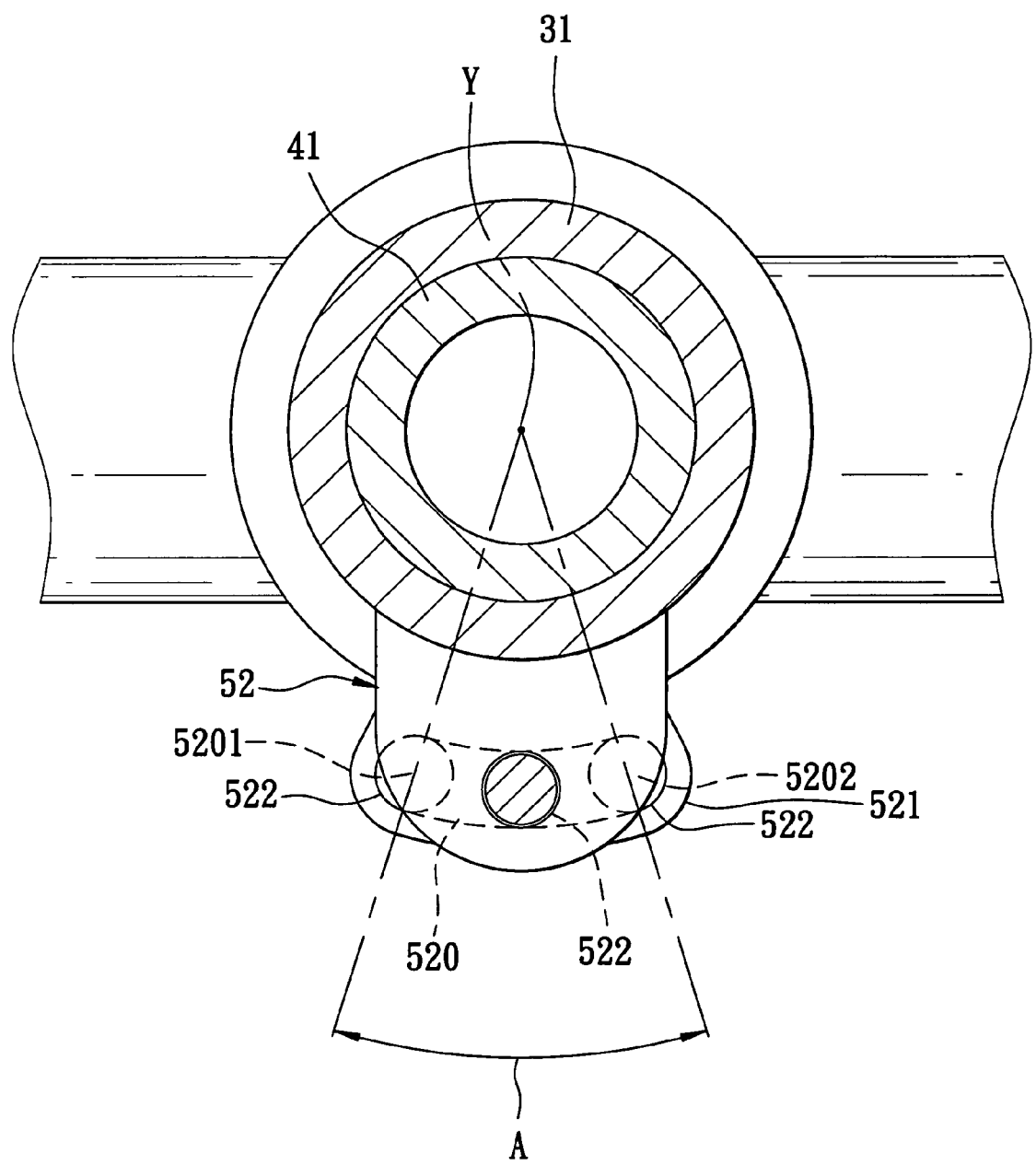
FIG. 4 is a sectional view to illustrate a groove and a plurality of holes in the second positioning unit of the preferred embodiment.

With further reference to FIGS. 3 and 4, the rotation limiting mechanism 5 includes first and second positioning units 51, 52, and an engaging unit 53. The first positioning unit 51 is coupled to the head tube 3, and includes upper and lower positioning members 511, 512. The upper positioning member 511 of the first positioning unit 51 is formed with a through hole 510. The lower positioning member 512 of the first positioning unit 51 is spaced apart from and is disposed below the upper positioning member 511, and is formed with a through-hole 510' that is registered with the through-hole 510 in the upper positioning member 511. The second positioning unit 52 is coupled to the steerer 41, and is formed with a groove 520 that extends circumferentially about the axis of rotation (Y) of the steerer 41, that is defined by a surrounding wall 521, and that has opposite ends 5201, 5202. As best shown in FIG. 4, the opposite ends 5201, 5202 of the groove 520 in the second positioning unit 52 are angularly spaced apart from each other by the second angle (A).

The steerer 41 is rotatable relative to the head tube 3 to a first aligned position, where the groove 520 in the second positioning unit 52 is registered with the through-holes 510, 510' in the upper and lower positioning members 511, 512 of the first positioning unit 51.

The rotation limiting mechanism 5 is further operable so as to limit rotation of the steerer 41 relative to the head tube 3 at different predetermined positions within the second angle (A), in a manner that will be described hereinafter.

The second positioning unit 52 is further formed with three angularly displaced holes 522, each of which is in spatial communication with the groove 520 in the second positioning unit 52. One of the holes 522 in the second positioning unit 52 is disposed between the first and second ends 5201, 5202 of the groove 520 in the second positioning unit 52, while each of the remaining two holes 522 in the second positioning unit 52 is disposed at a respective one of the first and second ends 5201, 5202 of the groove 520 in the second positioning unit 52.

The steerer 41 is rotatable relative to the head tube 3 to a second aligned position, where a selected one of the holes 522 in the second positioning unit 52 is registered with the through-holes 510, 510' in the upper and lower positioning members 511, 512 of the first positioning unit 51.

Figure 5:
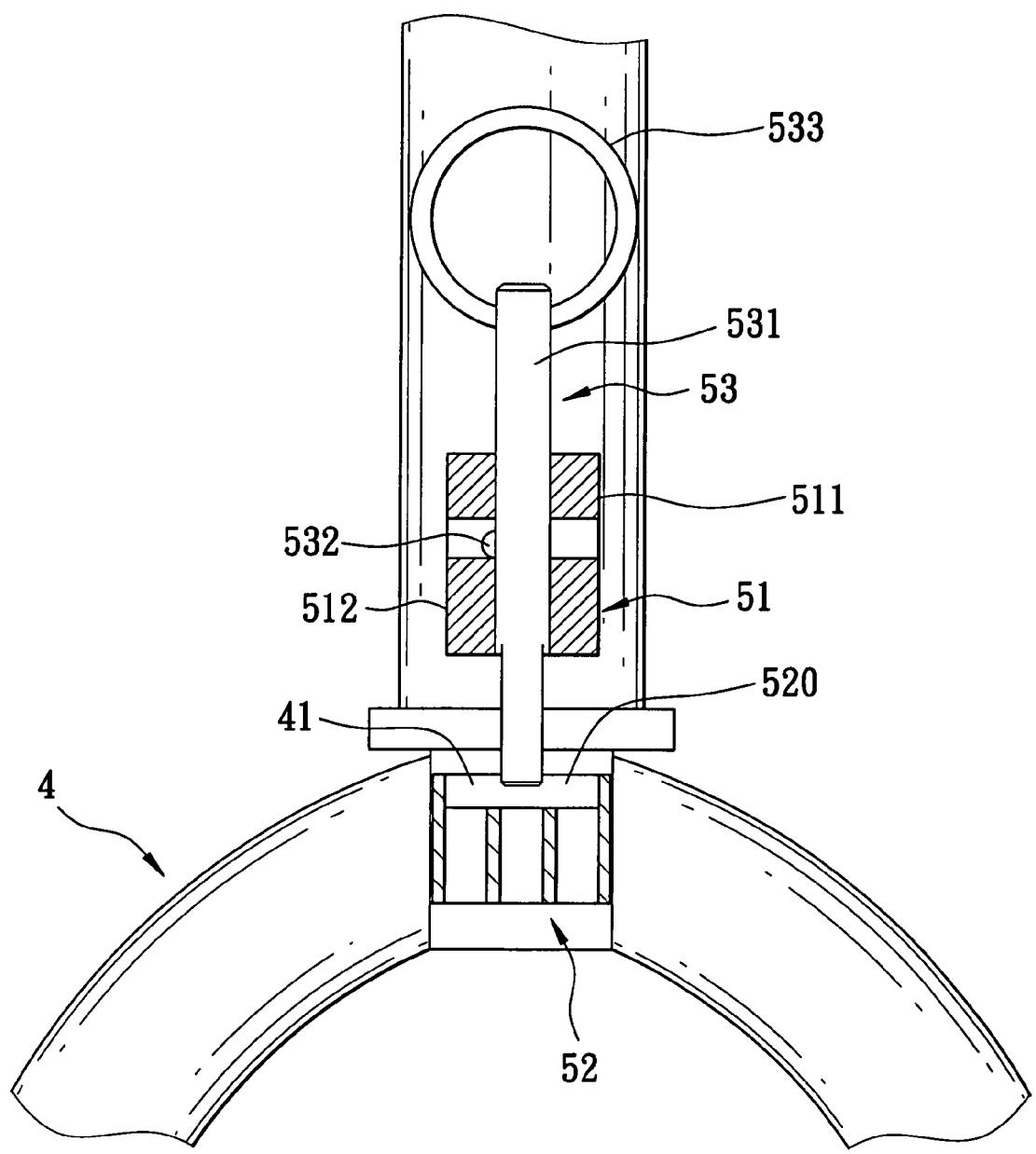
FIG. 5 is a fragmentary, partly sectional view of the preferred embodiment to illustrate a state where a shaft member of the engaging unit is disposed at a first position.

Referring to FIG. 5, the engaging unit 53 engages releasably the first and second positioning units 51, 52 so as to limit rotation of the steerer 41 relative to the head tube 3. In particular, the engaging unit 53 includes a shaft member 531 that extends fittingly and movably through the through-holes 510, 510' (see FIG. 3) in the upper and lower positioning members 511, 512 of the first positioning unit 51. The shaft member

531 of the engaging unit 53 is movable relative to the first positioning unit 51 to a first position, where the shaft member 531 extends into the groove 520 in the second positioning unit 52 when the steerer 41 is disposed at the first aligned position to thereby limit rotation of the steerer 41 relative to the head tube 3 within the second angle (A).

Figure 6:
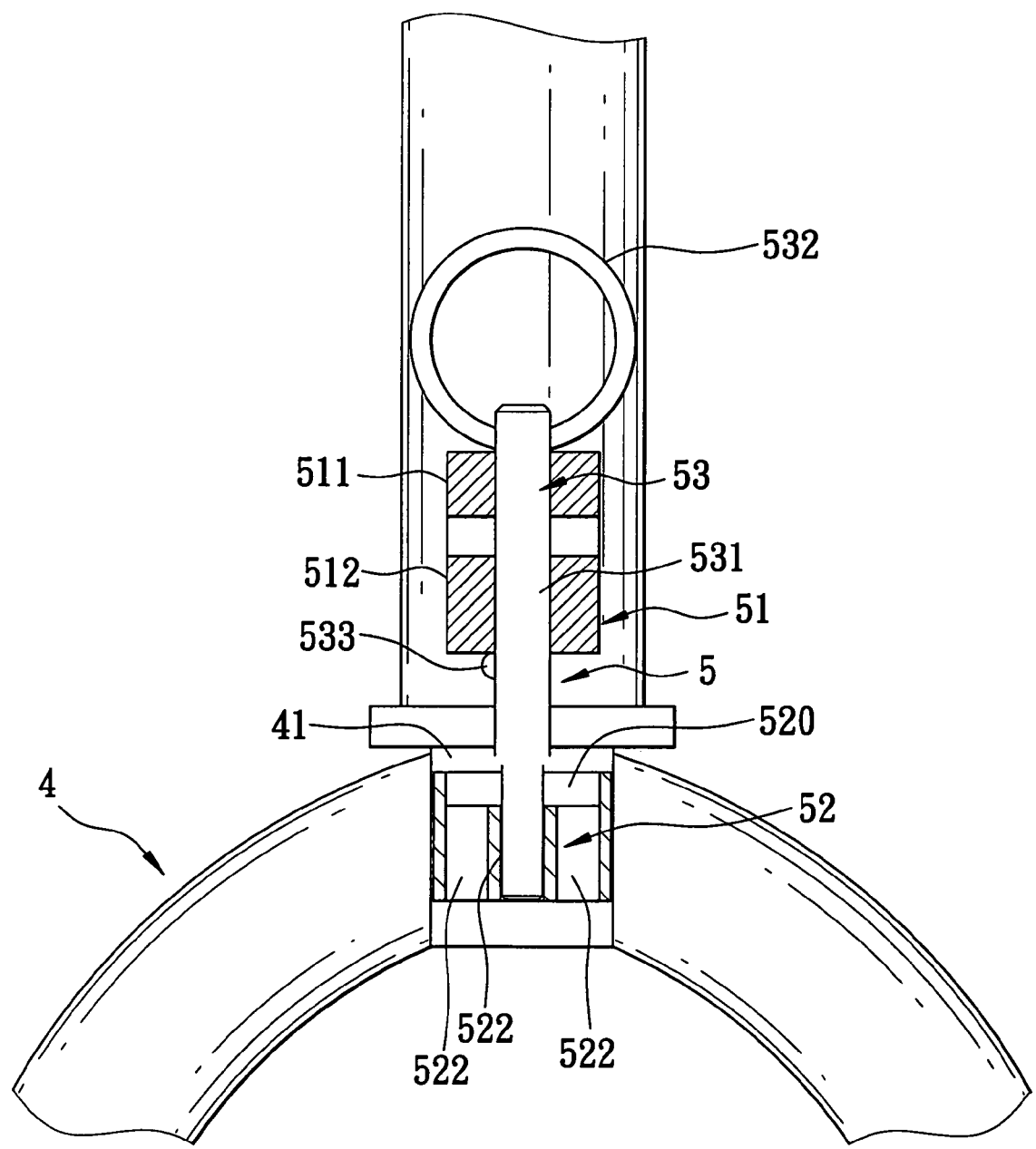
FIG. 6 is a fragmentary, partly sectional view of the preferred embodiment to illustrate another state where the shaft member of the engaging unit is disposed at a second position.
Figure 7:
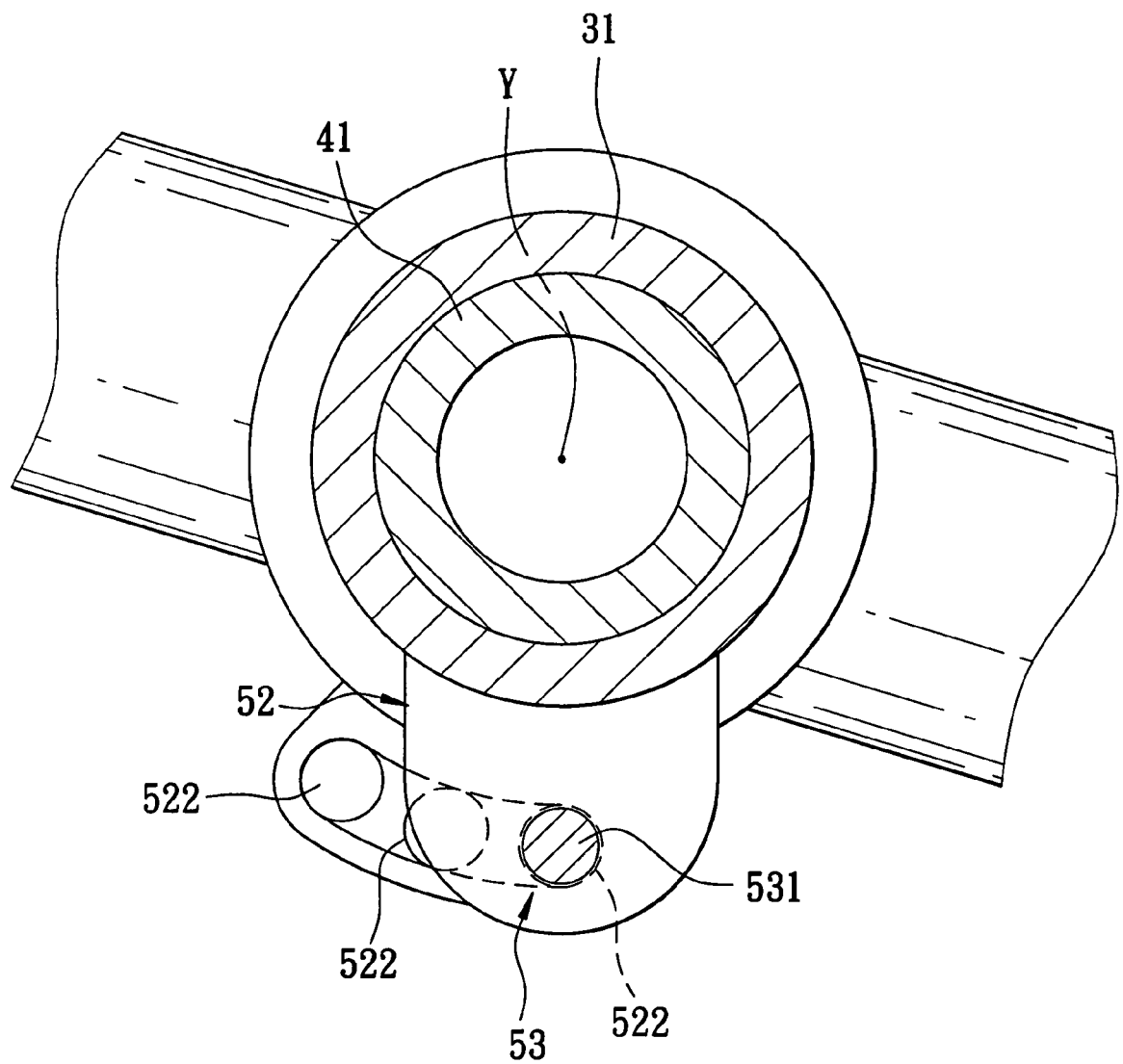
FIGS. 7 and 8 are sectional views of the preferred embodiment to illustrate yet another state where the shaft member of the engaging unit selectively extends into one of the holes in the second positioning unit through the groove in the second positioning unit.
Figure 8:
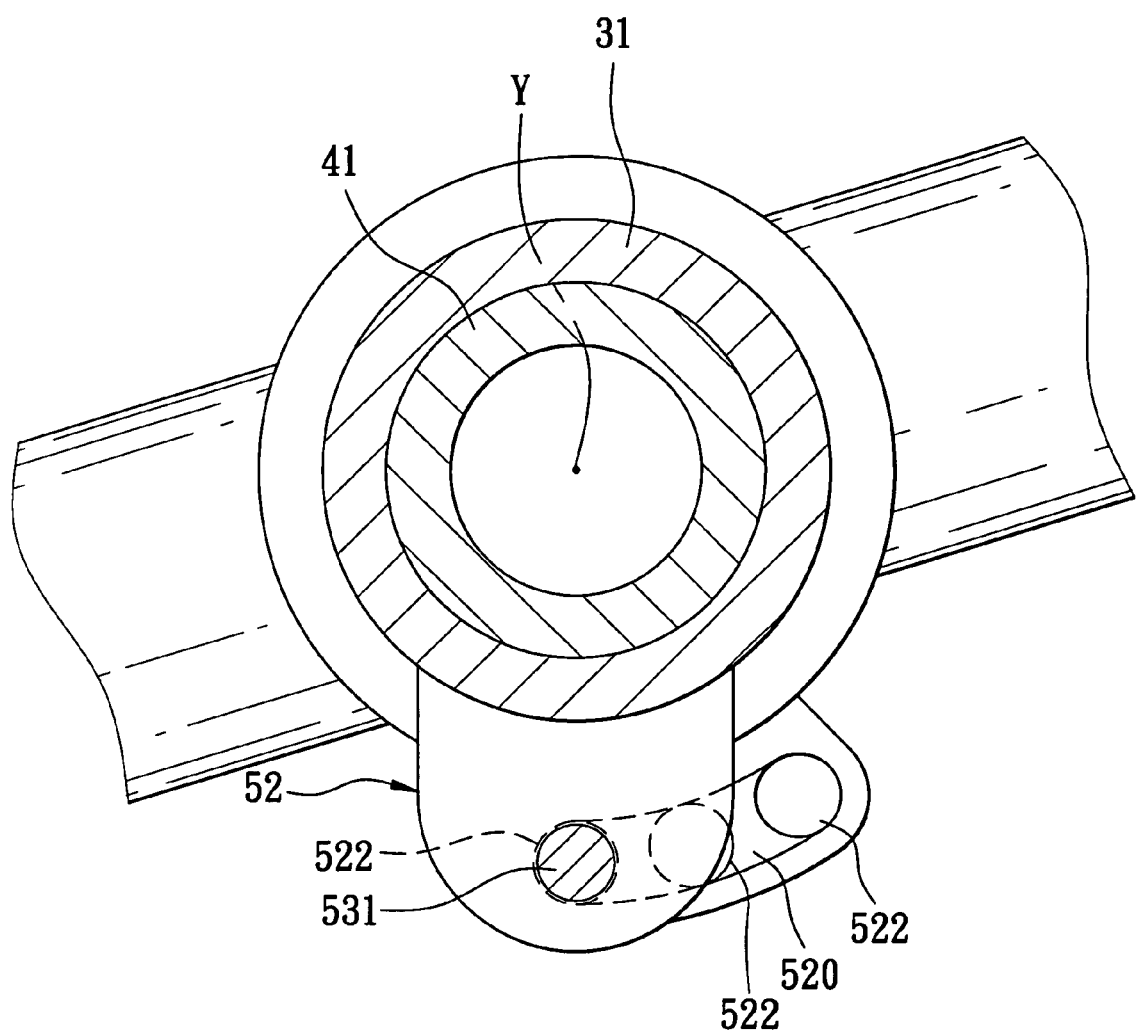

Referring to FIGS. 6 to 8, the shaft member 531 of the engaging unit 53 is movable relative to the first positioning unit 51 from the first position to a second position, where the shaft member 531 extends fittingly into a selected one of the holes 522 in the second positioning unit 52 through the groove 520 in the second positioning unit 52 when the steerer 41 is disposed at the second aligned position to thereby limit the rotation of the steerer 41 relative to the head tube 3 at a desired one of the predetermined positions within the second angle (A).

The engaging unit 53 further includes a retaining member 532 and a ring member 533. The retaining member 532 of the engaging unit 53 is provided on the shaft member 531 of the engaging unit 53, and engages the lower positioning member 512 of the first positioning unit 51 for retaining the shaft member 531 of the engaging unit 53 at the first position. In particular, when the shaft member 531 of the engaging unit 53 is disposed at the first position, the retaining member 532 is disposed between the upper and lower positioning members 511, 512, and abuts against the lower positioning member 512. In this embodiment, the retaining member 532 of the engaging unit 53 is resilient. As such, when a sufficient downward force is applied on the shaft member 531 of the engaging unit 53, the retaining member 532 disengages the lower positioning member 512 to permit movement of the shaft member 531 of the engaging unit 53 from the first position to the second position. The ring member 533 of the engaging unit 53 is provided on the shaft member 531 and is operable so as to move the shaft member 531 from the second position to the first position.

From the above description, during normal usage of the tricycle, when it is desired to permit rotation of the steerer 41 relative to the head tube 3 within the first angle, the shaft member 531 of the engaging unit 53 is disengaged from the second positioning unit 52, as best shown in FIG. 3. Moreover, when it is desired to limit rotation of the steerer 41 relative to the head tube 3 within the second angle (A), the steerer 41 is first disposed at the first aligned position. Thereafter, the shaft member 531 of the engaging unit 53 is disposed at the first position, as best shown in FIG. 5. Further, when it is desired to limit rotation of the steerer 41 relative to the head tube 3 at a desired one of the predetermined positions within the second angle (A), the steerer 41 is first disposed at the second aligned position. Thereafter, the shaft member 531 of the engaging unit 53 is disposed at the second position, as best shown in FIG. 6.

It has thus been shown that the vehicle frame 1 of this invention includes a head tube 3, a fork 4, and a rotation limiting mechanism 5. The fork 4 includes a steerer 41 that extends rotatably through the head tube 3 and that has an axis of rotation (Y). The steerer 41 is rotatable relative to the head tube 3 within a predetermined first angle. The rotation limiting mechanism 5 is operable so as to limit rotation of the steerer 41 relative to the head tube 3 within a second angle (A) that is less than the first angle. The rotation limiting mechanism 5 is further operable so as to limit rotation of the steerer 41 relative to the head tube 3 at three different predetermined positions within the second angle (A).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A vehicle frame, comprising:
a head tube;
a fork including a steerer that extends rotatably through said head tube, that has an axis of rotation, and that is rotatable relative to said head tube within a first angle; and
a rotation limiting mechanism operable so as to limit rotation of said steerer relative to said head tube, said rotation limiting mechanism including
a first positioning unit that is coupled to one of said head tube and said steerer and that is formed with a through-hole,
a second positioning unit that is coupled to the other of said head tube and said steerer and that is formed with a groove, said groove extending circumferentially about the axis of rotation of said steerer and having opposite ends, said opposite ends of said groove being angularly spaced apart from each other by a second angle less than the first angle, and
an engaging unit engaging releasably said first and second positioning units to thereby limit rotation of said steerer relative to said head tube;
wherein said steerer is rotatable relative to said head tube to a first aligned position, where said groove in said second positioning unit is registered with said through-hole in said first positioning unit; and
wherein said engaging unit includes a shaft member that extends fittingly and movably through said through-hole in said first positioning unit, said shaft member of said engaging unit being movable relative to said first positioning unit at a first position, where said shaft member of said engaging unit extends into said groove in said second positioning unit when said steerer is disposed at the first aligned position to thereby limit rotation of said steerer relative to said head tube within the second angle.

2. The vehicle frame as claimed in claim 1, wherein said rotation limiting mechanism is further operable so as to limit rotation of said steerer relative to said head tube at a position within the second angle,
said second positioning unit being further formed with a hole that is in spatial communication with said groove therein,
said steerer being rotatable relative to said head tube to a second aligned position, where said hole in said second positioning unit is registered with said through-hole in said first positioning unit,
said shaft member of said engaging unit being movable relative to said first positioning unit to a second position, where said shaft member extends fittingly into said hole in said second positioning unit through said groove in said second positioning unit when said steerer is disposed at the second aligned position to thereby limit rotation of said steerer relative to said head tube at the position within the second angle.

3. The vehicle frame as claimed in claim 1, wherein said engaging unit further includes a retaining member that is provided on said shaft member of said engaging unit and that engages said first positioning unit when said shaft member is disposed at the first position.

4. A vehicle frame, comprising:
a head tube;

a fork including a steerer that extends rotatably through said head tube; and a rotation limiting mechanism operable so as to limit rotation of said steerer relative to said head tube, said rotation limiting mechanism including a first positioning unit that is coupled to one of said head tube and said steerer and that is formed with a through-hole, a second positioning unit that is coupled to the other of said head tube and said steerer and that is formed with a hole, and an engaging unit engaging releasably said first and second positioning units to thereby limit rotation of said steerer relative to said head tube, and including a shaft member that extends fittingly and movably through said through-hole in said first positioning unit;

wherein said steerer is rotatable relative to said head tube to an aligned position, where said hole in said second positioning unit is registered with said through-hole in said first positioning unit; and wherein said shaft member of said engaging unit is movable relative to said first positioning unit between a first position, where said shaft member is disengaged from said second positioning unit, and a second position, where said shaft member extends fittingly into said hole in said second positioning unit.

* * * * *